United States Patent
Wickenberg

[15] 3,637,034
[45] Jan. 25, 1972

[54] HYDRAULIC SCALE

[72] Inventor: Chester H. Wickenberg, 1125 Forest Drive, Elgin, Ill. 60120

[22] Filed: July 6, 1970

[21] Appl. No.: 52,593

Related U.S. Application Data

[63] Continuation-in-part of Ser. No. 880,092, Nov. 26, 1969, abandoned.

[52] U.S. Cl................................................177/208, 73/411
[51] Int. Cl..........................................G01g 5/04, G01l 7/02
[58] Field of Search....................177/208, 209, 141; 73/411, 73/418

[56] References Cited

UNITED STATES PATENTS

| | | | |
|---|---|---|---|
| 514,256 | 2/1894 | Bristol | 73/411 |
| 957,471 | 5/1910 | Manning | 73/411 |
| 1,188,615 | 6/1916 | Bristol et al. | 73/411 X |
| 2,516,545 | 7/1950 | Brewster | 177/208 |
| 2,795,410 | 6/1957 | Reynard | 177/208 |

*Primary Examiner*—Robert S. Ward, Jr.
*Attorney*—James M. Wetzel and Jack C. Berenzweig

[57] ABSTRACT

There is disclosed a hydraulic weighing scale comprising a base member, a platform member mounted for vertical movement relative to the base member in response to a force being placed upon the platform, a bellows positioned between the platform and the base, lever means operatively connected between the platform and one side of the bellows wherein vertical movement of the platform results in a pressure increase in the bellows, a helically coiled hydraulic tube having either a horizontal or vertical axis wherein the first end of the tube is connected to the second side of the bellows and an indicator connected to the second end of the hydraulic tube wherein the pressure increase from the bellows causes an expansion of the hydraulic tube thereby causing a displacement of the indicator means, the displacement being proportional to the downward force on the platform.

A second embodiment discloses a hydraulic scale wherein the helically coiled hydraulic tube is replaced by a hydraulic tube helically coiled in a clock spring configuration. As in the first embodiment, one end of the hydraulic tube is connected to the bellows and the second end of the hydraulic tube is connected to an indicator.

In either of the two embodiments, the indicator and the helically coiled hydraulic tube may be located between the base member and the platform member or they may be located remotely to or externally from the platform member and base member.

27 Claims, 8 Drawing Figures

3,637,034

PATENTED JAN 25 1972

INVENTOR.
Chester H. Wickenberg
BY Hume, Clement, Hume & Lee
Attorneys.

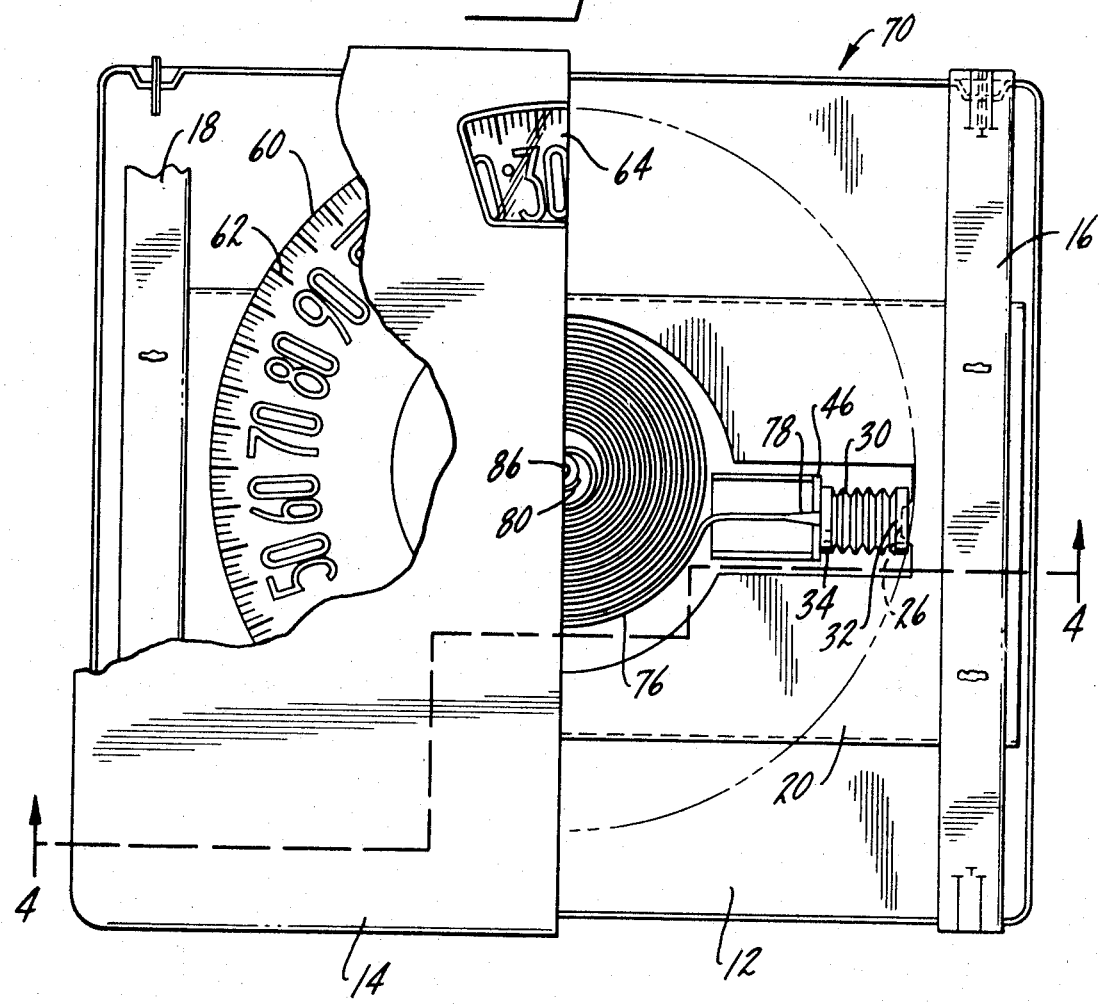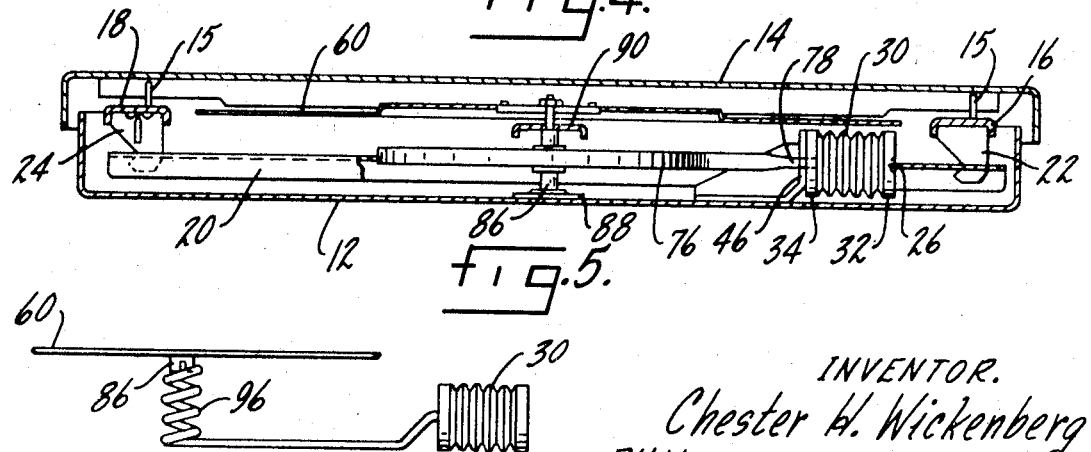

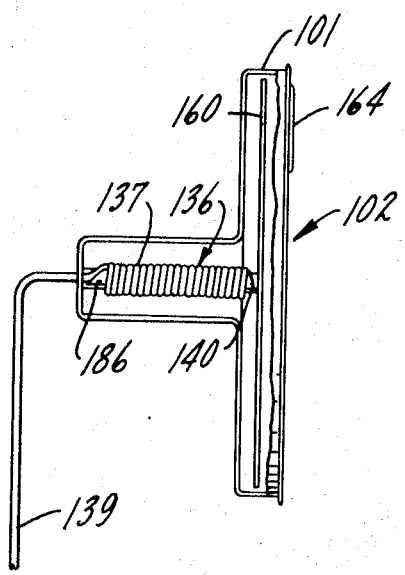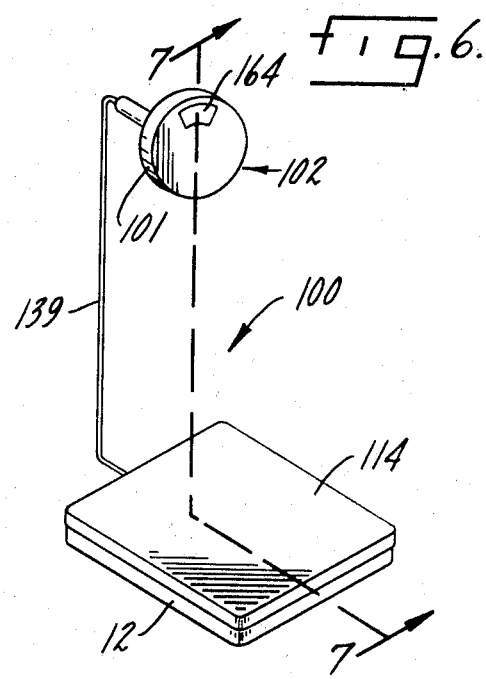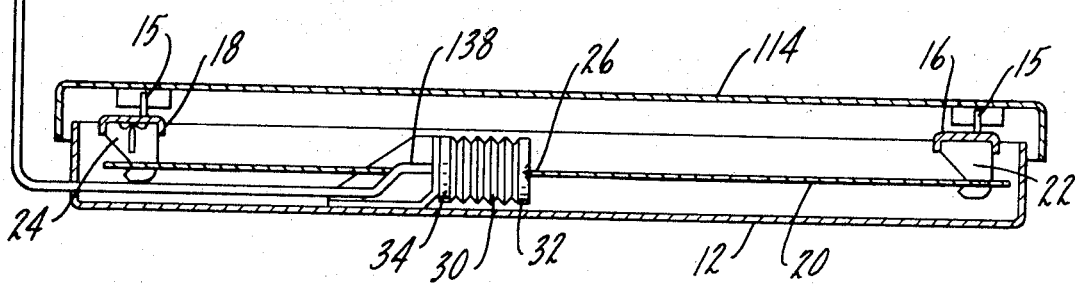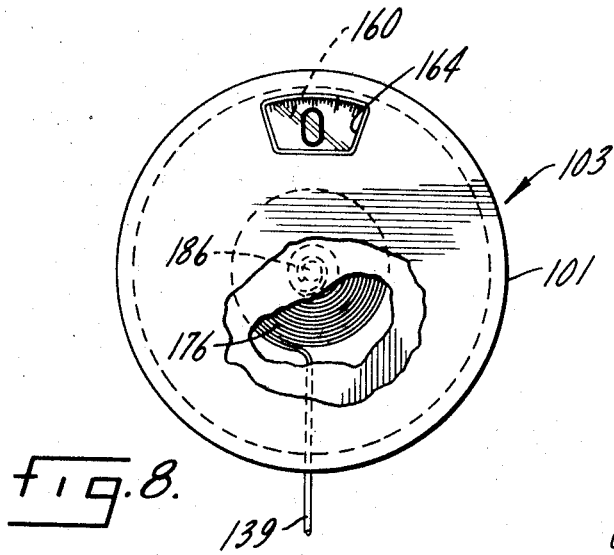

HYDRAULIC SCALE

CROSS-REFERENCES TO RELATED APPLICATIONS

This application is a continuation-in-part of application, Ser. No. 880,092, filed Nov. 26, 1969 and now abandoned, for a Hydraulic Scale.

BACKGROUND OF THE INVENTION

The present invention relates to weighing scales and more particularly to a hydraulic weighing scale adapted for household use.

A great number of bathroom scales are now available and the prices thereof range from a few dollars to substantial sums of money. To some extent the acc$racy of the scale is related to the price charged therefor. Most of the scales, however, and particularly those that are low priced, have a considerable degree of error and further, the precise indication of the magnitude of any given weight may vary from day to day with the same scale and it has also been found that different samples of the same model scale will provide different weight indications for a given predetermined weight. The user of these scales cannot expect great accuracy and must also appreciate that the margin of error is variable and may shift from day to day.

One limitation in the less expensive bathroom scales is that the platform and its support levers that transfer a weight imposed upon the platform to a dial are relatively instable and an accurate weight indication may be obtained only when the weight is proportionally centered on the platform. Such centering of the weight cannot be expected when persons using this scale step on and off hurriedly and do not understand that their weight should be properly centered on the platform.

Furthermore, weighing platforms were required to be rigid. Because of the relative instability and buckling of plastic and the sensitivity of the scale to the weight being equally distributed, plastic could not be used as a platform member. Thus, the prices of scales could not be reduced by the use of inexpensive plastic in place of metal.

In an attempt to overcome some of the above inadequacies, hydraulic scales for home use have been developed. These scales make use of a fluid pressure system consisting of a Bourdon tube gauge operated through a contained liquid by a bellows. A force created by the load to be weighed is transmitted to the bellows to create in the fluid pressure system a pressure proportional to the load, resulting in the movement of the Bourdon tube and of a needlelike indicator. The deflection of this needle when read against the calibrated dial would indicate the load. All such prior art hydraulic scales utilize Bourdon tubes and bellow arrangements having a vertical axis. Some of them utilized rubber membranes and hoses for the entire hydraulic system which leads to the ever present risk of leakage.

Moreover, heretofore, such hydraulic scales only utilize an indicator needle moving in relation to a stationary dial. Such a construction has been necessary in order to minimize the rotating weight of the indicator dial and to eliminate the kinetic energy which is built up by this rotation. This type of indicating system has not provided an accurate weight indication since the calibrated dial was necessarily small and difficult to read. Moreover, it has proved very difficult to accurately zero such a needle indicator.

Although such hydraulic scales have served the purpose, they have not proved entirely satisfactory under all conditions of service. The present invention overcomes these difficulties.

SUMMARY OF THE INVENTION

The general purpose of this invention is to provide a hydraulic scale which embraces all of the advantages of similarly employed scales and possesses none of the aforedescribed limitations. To attain this, the present invention contemplates two unique arrangements for the hydraulic tube utilized in the scale whereby greater accuracy is obtained and whereby a thinner, more aesthetically pleasing scale may be manufactured.

The hydraulic scale of the present invention comprises a base member, a platform member mounted for vertical movement relative to the base member in response to a force being placed upon the platform, a bellows horizontally positioned between the platform and the base, lever means operatively connected between the platform and one end of the bellows wherein a vertical movement of the platform results in a pressure increase in the bellows, a helically coiled hydraulic tube having either a horizontal or vertical axis connected to the second end of the bellows, and an indicator comprising a shaft and a rotating dial being connected to the second end of the hydraulic tube wherein the pressure increase from the bellows causes an expansion of the hydraulic tube, thereby causing a displacement of the shaft and the indicator dial, the displacement being proportional to the downward force on the platform.

Another embodiment substitutes a hydraulic tube helically coiled in a clock spring configuration for the hydraulic tube of the first embodiment. In either of the two embodiments, the indicator dial and the helically coiled hydraulic tube may be located between the base member and the platform member or they may be located external to the platform and base members. By utilizing these particular configurations of the hydraulic tube, a very slim scale may be manufactured. For example, the entire height of the scale from the bottom of the base to the top of the platform would be approximately 1 inch.

It is, therefore, an object of the present invention to provide a hydraulic scale utilizing a minimum of parts which is economical to manufacture.

Another object is to provide a weighing device particularly useful as a bathroom scale that provides much greater accuracy than the scales now available.

A further object is the provision of a bathroom scale utilizing a rotatable disc-shaped indicator dial which is more accurate and easier to read than conventional needle indicators.

Still another object is to provide a bathroom scale having an extremely thin profile.

Yet another object is the provision of an indicator for a hydraulic bathroom scale which prevents hunting of the calibrated dial so that the dial comes directly to the proper weight and holds that position and maintains such a position even though there may be slight shifting of the weight upon the platform.

A still further object is to provide a bathroom scale wherein buckling of the base or platform will have little or no effect on the accuracy of the scale.

A still further object is the provision of a hydraulic scale which may utilize a plastic platform.

A still further object is the provision of a hydraulic scale wherein an extremely small movement of the load platform will cause a full scale deflection of the indicator.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 3 is a plan view of a hydraulic scale, which constitutes the second preferred embodiment, with the load supporting platform partly broken away.

FIG. 4 is a cross-sectional view taken on the lines 4—4 of FIG. 3.

FIG. 5 is a cross-sectional view of a modification of the hydraulic tube shown in FIG. 4 which constitutes a third preferred embodiment.

FIG. 6 is a perspective view of a hydraulic scale having a remote or external weight indicator.

FIG. 7 is a sectional view taken along the lines 7—7 of FIG. 6.

FIG. 8 is a plan view of an alternative configuration for the external weight indicator shown in FIG. 6.

DESCRIPTION OF THE PREFERRED EMBODIMENTS

Figure 1:
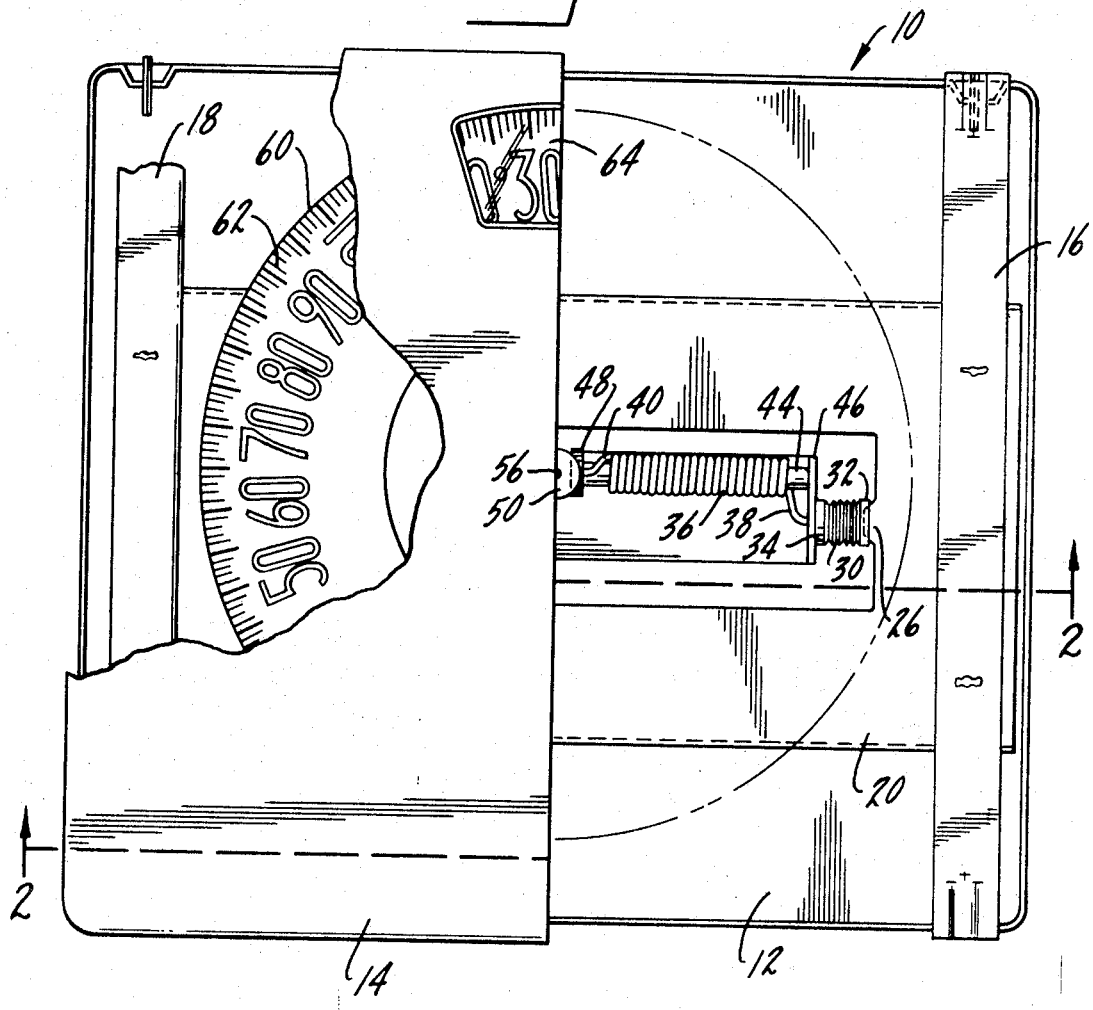
FIG. 1 is a plan view of a hydraulic scale, which constitutes a first preferred embodiment, with the load supporting platform partly broken away.
Figure 2:
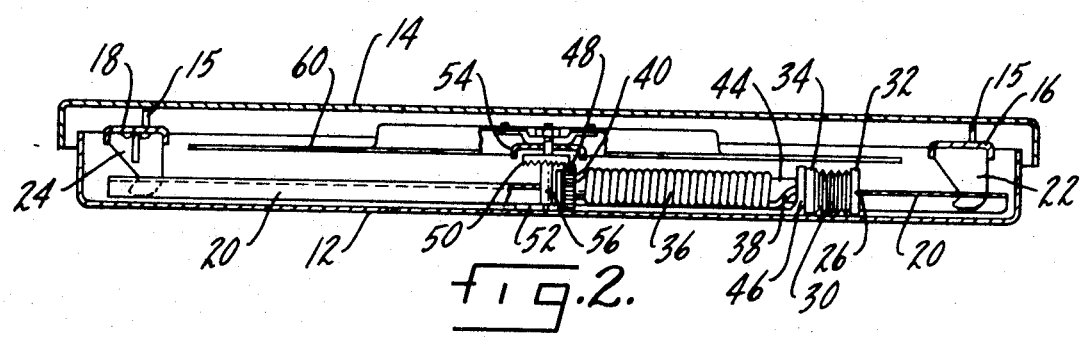
FIG. 2 is a cross-sectional view taken along the lines 2—2 of FIG. 1.

Referring now to the drawings wherein like reference characters designate like or corresponding parts throughout the several views, there is shown in FIGS. 1 and 2 a hydraulic scale 10 comprising a base 12 and a platform 14. The platform 14 is mounted for vertical movement relative to the base 12 in response to a force or a load being placed upon the platform 14. Platform 14 rests upon knife edges 15. These knife edges may be carried by the underside of platform 14 or may be an integral part of beams 16 and 18. Beams 16 and 18 are mounted parallel to each other upon beam levers 22 and 24, respectively. A connector plate 20 operatively connects beams 16 and 18 to each other.

When a weight or load is placed upon platform 14, knife edge 15 causes a downward deflection of either beam 16 or beam 18. This deflection is transmitted to beam levers 22 and 24. A knife edge 26 or an abutment is formed in connecting plate 20 and this knife edge or abutment moves in response to movement of beam levers 22 and 24. When beam 18 is depressed, beam lever 24 pulls knife edge 26 horizontally to the left, thereby transforming the downward vertical movement of the platform to a horizontal movement of the knife edge 26. Likewise, a downward deflection of beam 16 causes beam lever 22 to push knife edge 26 to the left, also thereby changing a downward vertical movement to a horizontal movement. In essence therefore, beams 16, 18, connecting plate 20, beam levers 22 and 24, and knife edge 26 constitute a lever means which is operatively connected to the platform to transform a vertical movement of the platform 14 into a horizontal movement of knife edge 26. It will also be recognized by one skilled in the art that it is immaterial which beam lever pulls and which beam lever pushes the knife edge.

A bellows 30 having a first end 32 and a second end 34 is horizontally disposed between platform 14 and base 12. In a preferred embodiment, bellows 30 comprises a metallic bellows having a small excursion wherein a slight compression of the first end 32 of bellows 30 will cause a great increase of pressure in the bellows. The second end 34 of bellows unit 30 is connected to a hydraulic tube 36. In a preferred embodiment, hydraulic tube 36 comprises a Bourdon tube. The Bourdon tube in conjunction with bellows 30 comprises a completely sealed, all metallic hydraulic system. In a first preferred embodiment, hydraulic tube 36 is helically wound around a shaft 44 having a horizontal axis. Shaft 44 is pivotally connected to a support means 46 which in turn is connected to base 12. Shaft 44 is free to rotate in response to any movement of the hydraulic tube 36. The second end 40 of hydraulic tube 36 is connected to a gear 48. The purpose of gear 48 is to transform the horizontal rotary motion of shaft 44 into a vertical motion. This is accomplished by using a second gear 50 placed at right angles to gear 48. Lastly, a pinion 56 is supported by lower and upper pinion supports 52 and 54, respectively. Pinion 56 therefore rotates in response to any rotation of shaft 44.

Attached to pinion 56 is a disclike indicator dial 60. Indicator dial 60 may comprise a calibrated scale 62 showing numerals indicating weights from 0 pounds to any maximum weight, for example, 300 pounds. Because of the large size of the disc comprising the indicator dial 60, a large accurate calibration may be employed on the dial. Lastly, a window 64 is provided in the platform 14 to enable the weight indicated by the indicator dial 60 to be seen by the person on the scale. It will be recognized by one skilled in the art that any similar indicator dial having a scale thereon may also be utilized.

Referring to FIGS. 1 and 2, the operation of hydraulic scale 10 will now be explained. As a weight is placed upon platform 14, a small downward deflection of beams 16 and 18 occurs. This deflection, as explained above, causes knife edge 26 of connecting plate 20 to compress bellows 30. For greater accuracy, knife edge 26 may be permanently attached to the first end 32 of bellows 30, thereby ensuring that the load placed upon bellows 30 will not shift due to sudden movement of the scale. While it is desirable to fixedly attach knife edge 26 by means of welding or the like, it will be recognized by one skilled in the art that this is not necessary for the adequate operation of the scale. Next, the compression of bellows 30 causes an increase in pressure in the bellows. This pressure increase is then transmitted to hydraulic tube or Bourdon tube 36 through the second end 34 of bellows 30, thereby causing the Bourdon tube 36 to expand. The expansion of the Bourdon tube 36, which is fixedly attached to shaft 44, causes the rotation of shaft 44. This rotation of the shaft 44 is directly proportional to the amount of weight placed upon the scale and it can be readily seen that this proportionality can be calibrated to reflect an accurate indication of the weight placed upon the scale. The rotation of shaft 44 is transmitted to gear 48. Gear 50, which is meshed with gear 48, then transmits this motion to pinion 56 which thereby rotates dial 60. The correct indication of the weight will then appear in window 64. While the movement of hydraulic tube 36 causes a rotary motion to be imparted to shaft 44 and to the indicator, it will be recognized by one skilled in the art that the movement of hydraulic tube 36 could be adapted to impart linear motion instead of rotary motion to an indicator.

By way of example, a 200-pound weight would cause approximately 50 pounds of force to be placed upon knife edge 26. This 50 pounds of force would then cause the compression of bellows 30. Bellows 30 would then generate approximately 300 p.s.i. of pressure on the Bourdon tube 36, thereby causing a rotation of the shaft 44. The amount of rotation can be measured and calibrated for each increment of weight that is placed upon the platform 14 and in this manner a calibrated dial may be obtained. Heretofore, it has not been possible to utilize a large, disc-type dial in a hydraulic scale due to the inherent inertia turning of the dial. As explained above, very thin needle indicators have been utilized to move against a stationary calibrated scale. In this way, the added inertia of the dial has been heretofore eliminated. The present invention contemplates a unique method of eliminating this inertia and thereby allowing the use of a large calibrated disc-type dial. By strangulating the hydraulic flow between bellows 30 and hydraulic tube 36, the dial 60 can be caused to rotate in a restrained manner so that no excessive kinetic energy builds up in the dial. This is accomplished by ensuring that the diameter of bellows 30 is much greater than the diameter of the hydraulic tube 36. Furthermore, any kinetic energy built up will be dampened due to the hydraulic tube 36 acting as a spring shock absorber.

The utilization of a helically coiled hydraulic tube 36, preferably a Bourdon tube, having a horizontal axis, allows for a very thin scale to be manufactured. In this first embodiment, the thinness of the scale is basically determined by the radius of the helical coil and may be as thin as 1 inch from the bottom of base 12 to the top of platform 14.

Referring now to FIGS. 3 and 4, a second preferred embodiment is disclosed. Hydraulic scale 70 shown in these figures is similar to hydraulic scale 10 and differs only in that the configuration of the hydraulic tube has been changed. FIGS. 3 and 4 show a hydraulic tube 76 helically coiled in a clock spring configuration about a vertical axis. As before, in a preferred embodiment, the hydraulic tube 76 may be a Bourdon-type tube. The first end 78 of the hydraulic tube is connected to bellows unit 30 while the second end 80 is connected directly to a pinion or shaft 86. Attached to shaft 86 is an indicator dial 60. As knife edge 26 is deflected due to a weight being placed upon a platform 14, a pressure is built up in bellows 30 thereby causing a deflection of hydraulic tube 76. This deflection causes the rotation of shaft or pinion 86, thereby causing the rotation of the indicator dial 60 in a manner described above. By utilizing a Bourdon tube having a vertical axis coiled in a clock springlike configuration, the thinness of the previous embodiment may be maintained. Moreover, by utilizing a vertical axis, it is possible to eliminate the extra gearing means which were required in the first embodiment, shown in FIGS. 1 and 2, to transform the motion of the Bourdon tube into a vertical rotary motion.

Referring now to FIG. 5, there is shown an alternative configuration for the hydraulic tube utilized in FIGS. 3 and 4. A helically coiled hydraulic tube 96 having a vertical axis may be substituted for the hydraulic tube 76 of FIG. 3. In this manner a helically coiled hydraulic tube may be utilized without the necessity of any gearing as is required in the embodiment shown in FIG. 1.

Referring now to FIG. 6, a hydraulic scale 100 having a remote or external indicator means 102 is disclosed. The hydraulic scale 100 is similar to the hydraulic scales 10 and 70 and differ only in that a remote indicator means 102 has been provided. It will be recalled that the hydraulic scales 10 and 70 shown in FIGS. 1 and 3 each included a window 64 in the platform member 14 through which the indicator dial 60 is visible. In both of these scales, as a weight is placed upon the platform 14, a downward deflection of beam 16 and 18 occur. This deflection is transmitted via the connecting plate 20 and causes compression of the bellows 30. The pressure increase in the bellows 30 caused by this compression causes the expansion of the hydraulic tubes 36 and 76 (also 96 in FIG. 5). The expansion of the hydraulic tubes 36 and 76 causes the respective shafts 56 and 86 to rotate thereby rotating the indicator dial 60.

Referring now to FIGS. 6 and 7, the operation of the hydraulic scale 100 will be explained. The hydraulic scale 100 comprises a base member 12 and a windowless platform member 114. The platform member 114 is mounted for vertical movement relative to the base member 12 in response to a force or a load being placed upon the platform 114. Platform 114 rests upon knife edges 15. These knife edges may be carried by the underside of platform 114 or may be an integral part of beams 16 and 18. Beams 16 and 18 are mounted parallel to each other upon beam levers 22 and 24, respectively. A connector plate 20 operatively connects beams 16 and 18 to each other.

As explained above in connection with the hydraulic scales 10 and 70, when a weight or load is placed upon platform 114, knife edge 15 causes a downward deflection of either beam 16 or beam 18. This deflection is transmitted to beam levers 22 and 24. A knife edge 26 or an abutment is formed in connecting plate 20 and this knife edge or abutment moves in response to movement of beam levers 22 and 24. When beam 18 is depressed, beam lever 24 pulls knife edge 26 horizontally to the left, thereby transforming the downward vertical movement of the platform to a horizontal movement of the knife edge 26. Likewise, a downward deflection of beam 16 causes beam lever 22 to push knife edge 26 to the left, also thereby changing a downward vertical movement to a horizontal movement. In essence therefore, beams 16, 18, connecting plate 20, beams levers 22 and 24, and knife edge 26 constitute a lever means which is operatively connected to the platform to transform a vertical movement of the platform 14 into a horizontal movement of knife edge 26. It will also be recognized by one skilled in the art that it is immaterial which beam lever pulls and which beam lever pushes the knife edge.

A bellows 30 having a first end 32 and a second end 34 is disposed between platform 114 and base 12. The second end 34 of the bellows 30 is connected to a first end 138 of a helically coiled hydraulic tube 136 which is located external to the base member 12 and the platform member 114. It can be seen that the hydraulic tubes 36 and 136 are identical except that the first end 138 of the hydraulic tube 136 is spaced apart from the helical coils 137 through an elongated segment 139 which forms a portion of the hydraulic tube while the first end 38 of the hydraulic tube 36 is spaced closely to the helical coils. AS before, the hydraulic tube 136 and the bellows 30 comprise a completely sealed hydraulic system.

The hydraulic tube 136 in FIG. 7 is helically wound around a shaft 186 and the second end 140 of the hydraulic tube 136 is fastened to the shaft 186. Attached to the shaft 186 is an indicator dial 160 which is similar to the indicator dial 60. The hydraulic tube 136, the shaft 186 and the indicator dial 160 are enclosed in an external housing 101. As the platform member 114 is deflected due to a load being placed thereupon, the pressure built up in the bellows 30 will cause an expansion of the hydraulic tube 136 thereby rotating the indicator dial 160 in an amount proportional to the weight placed upon the platform 114. The indicator dial 160 may be calibrated in any suitable manner as described above with regard to the indicator dial 60 and the weight indicated may be read through a window 164 present in the housing 101 of the indicator means 102. The indicator means 102 may be mounted on a wall adjacent to the scale or it may be self-supporting through the use of a rigid post attached between the base member 12 and the housing 101.

FIG. 8 discloses an external indicating means 103. In FIG. 8, a helical coil 176 wound in a clock spring configuration is used in place of the helical coil 136 of FIG. 7. The helical coil 176 is wound around the shaft 186 and operates in an identical manner to helical coil 136. The use of the clock spring configuration enables the indicator means 103 to assume a thinner shape than that of the indicator means 102.

It will be recognized by one skilled in the art that indicator dial 160 may be replaced by any similar indication device without departing from the spirit of the invention. It will also be recognized that a scale may readily be designed using both an external indicator as well as an indicator located beneath the platform.

In summary, therefore, the bellows unit 30 used in the embodiments shown acts only to confine the hydraulic fluid within the system and in effect, the load placed upon platform 14 is transferred directly by means of beams 16 and 18, beam levers 22 and 24, and knife edge 26 directly to the hydraulic tube, 36 or 76. The movement of the hydraulic tube then causes a movement of an indicating means such as shaft 56, 86 or 186, and indicator dial 60 or 160 which will accurately represent the magnitude of the load imposed upon platform 14 or 114.

It will be apparent that since platforms 14 and 114 are each mounted for free vertical movement relative to base 12, they can be moved considerably if the weight imposed thereon is shifted, as for example, from foot to foot of an individual standing thereon. Ordinarily, such jiggling of platform 14 results in an oscillation of the indicator and inaccurate weight indications are thereby registered. In the instant invention, however, jiggling of the platform in this manner does not cause appreciable movement of indicator dial 60 or 160 since the strangulation within the hydraulic system caused by the differing diameters between the bellows and the hydraulic tube prevents rapid movement of the hydraulic fluid throughout the system and the indicator dials 60 and 160 tend to maintain a single preselected position. By utilizing a pair of beams 16 and 18 as shown, the instant scales 10, 70 and 100 may utilize a plastic platform rather than a metal platform since distribution of the weight is not critical to an accurate reading of the scale.

Moreover, it can be see that the maximum diameter of dial 60 is limited only to the dimensions of platform 14 and base 12. The diameter of dial 60 may be substantially equal to but slightly less than either the length or width of base 12 or platform 14. This can readily be seen in FIGS. 1 and 3.

While no zeroing means for the dial 60 or 160 has been disclosed, it will be readily appreciated that a screw (not shown) connected to the bellows unit 30 may be utilized to adjust the compression of the bellows so that when no load is present on the platform, indicator dial 60 or 160 would register zero. The adjustment of this screw changes the pressure transmitted by bellows 30 to the hydraulic tube thereby regulating the zeroing portion of the indicator dial. The relation of the parts in the hydraulic system are adjusted such that in the unloaded condition, indicator dial would read slightly below zero if the screw were just in contact with the bellows without compressing it. By turning the screw slightly, thereby compressing the bellows, a slight pressure is built up which brings the indicator dial 60 to zero, thus giving enough leeway to permit adjustment of the dial to any variation in gauge position caused by expansion or contraction of the fluid.

It should be understood, of course, that the foregoing disclosure relates only to preferred embodiments of the invention and that numerous modifications or alterations may be made therein without departing from the spirit and the scope of the invention as set forth in the appended claims.

What is claimed is:

1. A hydraulic weighing scale comprising:
   a base member;
   a platform member mounted for vertical movement relative to said base member in response to a force being placed upon said platform;
   a bellows, having a horizontal axis, positioned between said platform and said base, said bellows comprising a first end and a second end;
   lever means operatively connected between said platform and said first end of said bellows wherein said vertical movement of said platform results in a pressure increase in said bellows;
   conduit means, said conduit means having a first end and a second end, said first end of said conduit means being connected to said second end of said bellows, said conduit means having a diameter less than the diameter of said bellows;
   shaft means connected to said second end of said conduit means; and
   a rotating disclike indicator dial connected to said shaft means wherein said pressure increase from said bellows causes an expansion of said conduit thereby rotating said shaft and said dial, said rotation being proportional to said downward force on said platform.

2. The hydraulic scale of claim 1 wherein said conduit means comprises a Bourdon tube.

3. The hydraulic system of claim 2 further comprising gear means connected between said shaft means and said indicator dial wherein said shaft means and said indicator dials are angularly displaced.

4. The hydraulic scale of claim 3 wherein said shaft means is disposed horizontally to said platform and wherein the axis of said dial is disposed perpendicularly to said platform.

5. The hydraulic scale of claim 2 wherein said diameter of said disclike indicator dial is substantially equal to the width of said platform.

6. A hydraulic weighing scale comprising:
   a base member;
   a platform member mounted for vertical movement relative to said base member in response to a force being placed upon said platform;
   a bellows positioned between said platform and said base, said bellows comprising a first end and a second end;
   lever means operatively connected between said platform and said first end of said bellows wherein said vertical movement of said platform results in a pressure increase in said bellows;
   a helically coiled hydraulic tube, having a horizontal axis, a first end and a second end, said first end of said tube being connected to said second end of said bellows; and
   indicator means connected to said second end of said tube wherein said pressure increase from said bellows causes an expansion of said hydraulic tube thereby causing a displacement of said indicator means, said displacement being proportional to said downward force on said platform.

7. The hydraulic scale of claim 6 wherein said indicator means comprises:
   shaft means rotatably connected to said second end of said hydraulic tube; and
   an indicator dial rotatably connected to said shaft means wherein rotation of said shaft means causes a rotation of said dial proportional to said downward force on said platform.

8. The hydraulic scale of claim 7 wherein said shaft means is horizontally disposed with respect to said platform.

9. The hydraulic scale of claim 8 wherein said axis of said hydraulic tube and said axis of said shaft means coincide.

10. A hydraulic weighing scale comprising:
    a base member
    a platform member mounted for vertical movement relative to said base member in response to a force being placed upon said platform;
    a bellows, having a first end and a second end, said bellows being horizontally disposed with respect to said platform;
    lever means operatively connected between said platform and first end of said bellows wherein said vertical movement of said platform results in a horizontal displacement of said bellows;
    shaft means, horizontally disposed with respect to said platform and mounted for rotatable motion;
    a disclike indicator dial rotatably mounted on a vertical shaft;
    gear means connected between said horizontal shaft and said vertical shaft wherein rotation of said horizontal shaft causes rotation of said indicator dial; and
    A Bourdon tube helically coiled around said horizontal shaft means having a first end and a second end, said first end of said tube being connected to said second end of said bellows and said second end of said tube being connected to said horizontal shaft means wherein said horizontal displacement of said bellows causes an expansion of said Bourdon tube thereby causing a rotation of said indicator dial, said rotation being proportional to said downward force on said platform.

11. The hydraulic scale of claim 10 wherein the diameter of said disclike indicator dial is substantially equal to the width of said platform.

12. The hydraulic scale of claim 11 wherein said diameter of said Bourdon tube is less than the diameter of said bellows.

13. A hydraulic weighing scale comprising:
    a base member;
    a platform member mounted for vertical movement relative to said base member in response to a force being placed upon said platform;
    a bellows, having a horizontal axis, positioned between said platform and said base, said bellows comprising a first end and a second end;
    lever means operatively connected between said platform and said first end of said bellows wherein said vertical movement of said platform results in a pressure increase in said bellows;
    a hydraulic tube helically coiled in a clock spring configuration, about a vertical axis, having a first end and a second end, said first end of said tube being connected to said second end of said bellows; and
    indicator means connected to said second end of said hydraulic tube wherein said pressure increase from said bellows causes an expansion of said hydraulic tube thereby causing a displacement of said indicator means, said displacement being proportional to said downward force on said platform.

14. The hydraulic scale of claim 6 wherein said indicator means comprises:
    shaft means rotatably connected to said second end of said hydraulic tube; and
    an indicator dial rotatably connected to said shaft means wherein rotation of said shaft means causes a rotation of said dial proportional to said downward force on said platform.

15. The hydraulic scale of claim 12 wherein said shaft means is vertically disposed with respect to said platform.

16. The hydraulic scale of claim 13 wherein said indicator dial comprises a rotatable disc and wherein the diameter of said disc is substantially equal to the width of said platform.

17. The hydraulic scale of claim 14 wherein said diameter of said hydraulic tube if less than the diameter of said bellows.

18. A hydraulic weighing scale comprising:
a base member;
a platform member mounted for vertical movement relative to said base member in response to a force being placed upon said platform;
a bellows, having a first end and a second end, said bellows being horizontally disposed with respect to said platform;
lever means operatively connected between said platform and first end of said bellows wherein said vertical movement of said platform results in a horizontal displacement of said bellows;
shaft means, vertically disposed with respect to said platform and mounted for rotatable motion;
a disclike indicator dial rotatably mounted on said vertical shaft; and
a helical Bourdon tube of flat clock spring configuration, coiled about said vertical shaft means, having a first end and a second end, said first end of said tube being connected to said second end of said bellows and said second end of said tube being connected to said rotatable shaft means wherein said horizontal displacement of said bellows causes an expansion of said Bourdon tube thereby causing a rotation of said indicator dial, said rotation being proportional to said downward force on said platform.

19. A hydraulic weighing scale comprising:
a base member;
a platform member mounted for vertical movement relative to said base member in response to a force being placed upon said platform;
a bellows having a horizontal axis positioned between said platform and said base, said bellows comprising a first end and a second end;
lever means operatively connected between said platform and said first end of said bellows wherein said vertical movement of said platform results in a pressure increase in said bellows;
a helically coiled hydraulic tube, having a vertical axis, a first end and a second end, said first end of said tube being connected to said second end of said bellows; and
indicator means connected to said second end of said tube wherein said pressure increase from said bellows causes an expansion of said hydraulic tube thereby causing a displacement of said indicator means, said displacement being proportional to said downward force on said platform.

20. The hydraulic scale of claim 19 wherein said indicator means comprises:
shaft means rotatably connected to said second end of said hydraulic tube; and
an indicator dial rotatably connected to said shaft means wherein rotation of said shaft means causes a rotation of said dial proportional to said downward force on said platform.

21. The hydraulic scale of claim 20 wherein said shaft means is vertically disposed with respect to said platform.

22. The hydraulic scale of claim 21 wherein said axis of said hydraulic tube and said axis of said shaft means coincide.

23. A hydraulic weighing scale comprising:
a base member;
a platform member mounted for vertical movement relative to said base member in response to a force being placed upon said platform;
a bellows having a horizontal axis, positioned between said platform and said base, said bellows comprising a first end and a second end;
lever means operatively connected between said platform and said first end of said bellows wherein said vertical movement of said platform results in a pressure increase in said bellows;
a helically coiled hydraulic tube having a first end and a second end, said first end of said tube being connected to said second end of said bellows; and
indicator means connected to said second end of said tube wherein said pressure increase from said bellows causes an expansion of said hydraulic tube thereby causing a displacement of said indicator means, said displacement being proportional to said downward force on said platform.

24. The hydraulic scale of claim 23 wherein said helically coiled hydraulic tube is located external to said base member and said platform member thereby providing an external indicator means.

25. The hydraulic scale of claim 24 wherein said external indicator means comprises:
shaft means rotatably connected to said second end of said hydraulic tube; and
an indicator dial rotatably connected to said shaft means wherein rotation of said shaft means causes a rotation of said dial proportional to said downward force on said platform.

26. The hydraulic scale of claim 19 wherein said hydraulic tube helically coiled in a clock spring configuration is located external to said base member and said platform member thereby providing an external indicator means.

27. The hydraulic scale of claim 26 wherein said external indicator means comprises:
shaft means rotatably connected to said second end of said hydraulic tube; and
an indicator dial rotatably connected to said shaft means wherein rotation of said shaft means causes a rotation of said dial proportional to said downward force on said platform.

* * * * *